(12) United States Patent
Kalra et al.

(10) Patent No.: US 9,695,715 B2
(45) Date of Patent: Jul. 4, 2017

(54) ELECTROTHERMAL ENERGY STORAGE SYSTEM AND AN ASSOCIATED METHOD THEREOF

(71) Applicant: General Electric Company, Schenectady, NY (US)

(72) Inventors: Chiranjeev Singh Kalra, Niskayuna, NY (US); Andrew Maxwell Peter, Saratoga Springs, NY (US); Roger Allen Shisler, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 323 days.

(21) Appl. No.: 14/554,081

(22) Filed: Nov. 26, 2014

(65) Prior Publication Data

US 2016/0146061 A1   May 26, 2016

(51) Int. Cl.
*F01K 25/10* (2006.01)
*F28D 20/02* (2006.01)
*F22B 1/02* (2006.01)
*F28D 20/00* (2006.01)
*F03G 6/00* (2006.01)
*F03G 6/06* (2006.01)
*F01K 3/12* (2006.01)

(52) U.S. Cl.
CPC ............. *F01K 25/103* (2013.01); *F01K 3/12* (2013.01); *F03G 6/003* (2013.01); *F03G 6/065* (2013.01); *F22B 1/02* (2013.01); *F28D 20/00* (2013.01); *F28D 20/0034* (2013.01); *F28D 20/02* (2013.01); *F28D 2020/0047* (2013.01); *Y02E 10/46* (2013.01)

(58) Field of Classification Search
CPC ........ F01K 25/103; F03G 6/065; F03G 6/003; F28D 20/00; F28D 2020/0047; Y02E 10/46
USPC ................................ 60/641.8, 651, 671, 659
See application file for complete search history.

(56) References Cited

U.S. PATENT DOCUMENTS

| 4,765,143 A | 8/1988 | Crawford et al. |
| 8,584,463 B2 | 11/2013 | Hemrle et al. |
| 2009/0179429 A1* | 7/2009 | Ellis ............. F01K 3/12 290/1 R |

(Continued)

FOREIGN PATENT DOCUMENTS

| EP | 2698506 A1 | 2/2014 |
| WO | 2012049092 A1 | 4/2012 |

(Continued)

*Primary Examiner* — Hoang Nguyen
(74) *Attorney, Agent, or Firm* — Pabitra K. Chakrabarti

(57) ABSTRACT

An electrothermal energy storage and discharge system is provided including a charging cycle and a discharging cycle. The charging cycle includes a refrigeration unit and a thermal unit, and the discharging cycle includes a power unit. The refrigeration unit is driven by an excess electric power and is configured to generate a cold energy storage having a solid carbon dioxide. The thermal unit is driven by a thermal energy and is configured to generate a hot energy storage and/or provide a hot source. The power unit operates between the cold energy storage and at least one of the hot energy storage and hot source so as to retrieve the energy by producing a high pressure carbon dioxide and a hot supercritical carbon dioxide, and generating an electric energy using the hot supercritical carbon dioxide.

20 Claims, 7 Drawing Sheets

(56) References Cited

U.S. PATENT DOCUMENTS

| | | | |
|---|---|---|---|
| 2011/0139407 A1 | 6/2011 | Ohler et al. | |
| 2012/0222423 A1* | 9/2012 | Mercangoez | F01K 3/006 60/645 |
| 2012/0319410 A1* | 12/2012 | Ambrosek | F02C 1/05 290/1 R |
| 2013/0087301 A1 | 4/2013 | Hemrle et al. | |
| 2014/0060051 A1* | 3/2014 | Ohler | F01K 3/12 60/652 |
| 2014/0174080 A1* | 6/2014 | Friesth | F01K 3/00 60/641.1 |
| 2015/0069758 A1* | 3/2015 | Davidson | F01D 15/10 290/52 |

FOREIGN PATENT DOCUMENTS

| | | |
|---|---|---|
| WO | 2012168472 A2 | 12/2012 |
| WO | 2013064524 A1 | 5/2013 |
| WO | 2013102537 A2 | 7/2013 |

\* cited by examiner

ELECTROTHERMAL ENERGY STORAGE SYSTEM AND AN ASSOCIATED METHOD THEREOF

BACKGROUND

The present invention relates to an electrothermal energy storage system and more particularly to the use of carbon dioxide ($CO_2$) in such energy storage system for direct storage and retrieval of energy.

Energy storage systems, such as electrical energy storage systems, use an excess of electric power to compress a gas, for example, air in a charging cycle, for storing the energy in a compressed fluid, and expand the compressed fluid in a discharging cycle, for driving a generator and retrieving the electric energy. However, such compressed air energy storage systems may require access to underground caverns for pressure storage of the compressed fluid which may not be economical, and thus have limited deployment.

Further, energy storage systems, such as thermal energy systems, may store thermal energy such as a solar energy in a molten nitrite salt, retrieve the energy to heat water or other working fluids such as carbon dioxide ($CO_2$) and the like via a heat exchanger, and expand the vaporized fluid for driving the generator to generate the electric energy. However, such thermal energy storage systems are not presently suitable for electric energy storage due to low round-trip efficiency of conventional electric-to-thermal conversion technology, such as resistive heaters or heat pumps.

Thus, there is a need for an improved energy system for directly storing energy from multiple sources such as electricity and thermal energy, and for efficiently retrieving the stored energy and converting it to electricity.

BRIEF DESCRIPTION

In one embodiment, the present invention provides an electrothermal energy storage system having a charging cycle and a discharging cycle for storing and discharging energy. The electrothermal energy storage system includes a refrigeration unit driven by an excess electric power and is configured to generate a cold energy storage by converting liquid carbon dioxide to solid carbon dioxide. Further, the electrothermal energy storage system includes a thermal unit driven by a thermal energy and is configured to provide at least one of a hot energy storage and a hot source. The electrothermal energy storage system further includes a power unit configured to operate using the cold energy storage, as a heat sink and at least one of the hot energy storage and the hot source, as a heat source to retrieve the energy. The electrothermal energy storage system is configured to produce a high pressure carbon dioxide, heat the high pressure carbon dioxide to produce a supercritical carbon dioxide, further heat the supercritical carbon dioxide to produce a hot supercritical carbon dioxide, and generate an electric energy using the expansion of the hot supercritical carbon dioxide in a turbine.

In another embodiment, the present invention provides a method for storing and retrieving energy in an electrothermal energy storage system. The method includes generating a cold energy storage by converting a portion of a liquid carbon dioxide into a solid carbon dioxide through a refrigeration unit driven by an excess electric power. Further, the method includes providing at least one of a hot energy storage and a hot source through a thermal unit driven by a thermal energy. The method further includes retrieving the energy in the solid carbon dioxide by operating a power unit using the cold energy storage and at least one of the hot energy storage and the hot source, wherein the power unit produces a high pressure carbon dioxide, heats the high pressure carbon dioxide to produce a supercritical carbon dioxide, further heats the supercritical carbon dioxide to produce a hot supercritical carbon dioxide, and generates an electric energy using the hot supercritical carbon dioxide.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a new energy system for efficiently storing energy from an excess electric power and a thermal energy, and discharging the energy to generate an electric energy. An electrothermal energy storage system of the present invention operates with a multi-phase transcritical carbon dioxide ($CO_2$) for directly storing an excess electric power in a solid $CO_2$ and for directly discharging the energy from a hot supercritical $CO_2$ to generate an electric energy. The electrothermal energy storage system includes a charging cycle and a discharging cycle. The charging cycle includes a refrigeration unit and a thermal unit, and the discharging cycle includes a power unit. The refrigeration unit is driven by the excess electric power and is configured to generate a cold energy storage by converting liquid $CO_2$ into solid $CO_2$. The thermal unit is driven by a thermal energy and is configured to provide at least one of a hot energy storage and a hot source. The power unit operates using the cold energy storage and at least one of the hot energy storage and the hot source to retrieve the energy by producing a high pressure $CO_2$ from the liquid $CO_2$, heating the liquid $CO_2$ to produce a hot supercritical $CO_2$ ($sCO_2$) using a vaporized $CO_2$ received from a turbine exhaust, and at least one of the hot energy storage and the hot source, generating the electric energy by expanding the hot sCO$_2$ in a turbine-generator, and condensing the turbine exhaust using stored solid CO$_2$ to retrieve the liquid CO$_2$.

Figure 1:
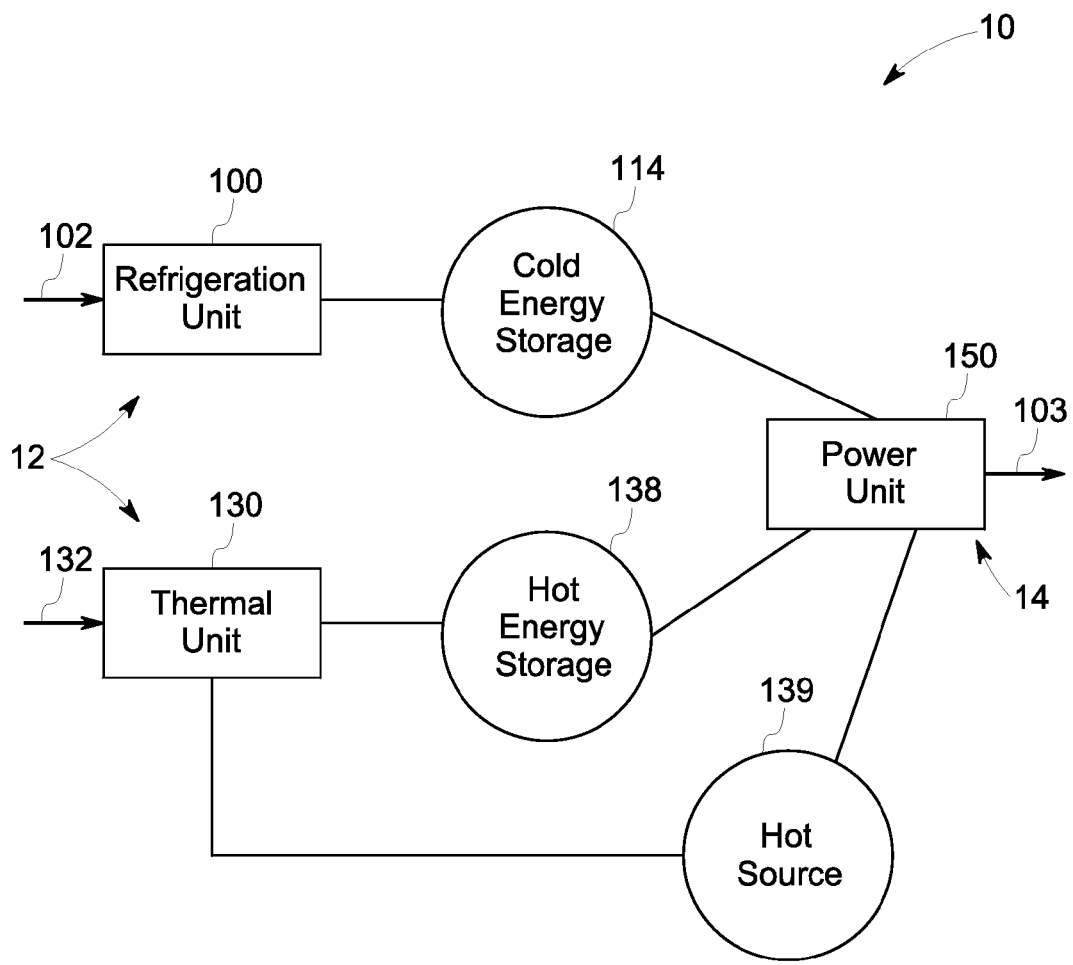
FIG. 1 illustrates a block diagram representing a electrothermal energy storage system in accordance with one exemplary embodiment.

FIG. 1 represents a block diagram of an electrothermal energy storage system 10 in accordance with one exemplary embodiment of the present invention. The electrothermal energy storage system 10 includes a charging cycle 12 and a discharging cycle 14. In the charging cycle 12, the electrothermal energy storage system 10 is configured to store an excess electric power 102 as a cold energy storage 114. Further, the electrothermal energy storage system 10 is configured to store a thermal energy 132 as a hot energy storage 138 or provide the thermal energy 132 as a hot source 139. In the discharging cycle 14, the electrothermal energy storage system 10 is configured to retrieve the energy from the cold energy storage 114, and at least one of the hot energy storage 138 and the hot source 139, to generate an electric energy 103.

In the illustrated embodiment, the electrothermal energy storage system 10 includes a refrigeration unit 100, and a thermal unit 130 for performing the charging cycle 12, and a power unit 150 for performing the discharging cycle 14.

The refrigeration unit 100 is driven by the excess electric power 102 and is configured to generate a cold energy storage 114. Specifically, the refrigeration unit 100 receives a liquid carbon dioxide (CO$_2$) (not shown in FIG. 1) and converts at least a portion of the liquid CO$_2$ to a solid CO$_2$ (not shown in FIG. 1) to generate the cold energy storage 114 and thereby directly storing the excess electric power 102 in a solid CO$_2$ which functions as a heat sink.

The thermal unit 130 is driven by the thermal energy 132, for example a solar energy obtained through a concentrated solar power (CSP), and is configured to generate a hot energy storage 138. Specifically, the thermal unit 130 receives a molten salt (not shown in FIG. 1) and adds heat to the molten salt via the thermal energy 132 to generate the hot energy storage 138 including a hot molten salt, which functions as a heat source.

In certain other embodiments, the thermal unit 130 is driven the thermal energy 132 to provide the hot source 139. In a non-limiting example, such thermal unit 130 may be a concentrated solar power (CSP) which is driven by a solar energy 132 to provide the hot source 139. In such embodiment, the hot source 139 obtained from the thermal unit 130 may not be stored and may be continuously used for directly heating the supercritical CO$_2$ via a first heat exchanger (not shown in FIG. 1) which is explained in greater detail below. While, in certain other embodiments, the readily available thermal energy 132 may be used for directly heating the supercritical CO$_2$ via the first heat exchanger. In such embodiments, the source of the thermal energy 132 is from a gas turbine exhaust, an industrial waste heat, and the like.

The power unit 150 is configured to operate using the cold energy storage 114 and at least one of the hot energy storage 138 and the hot source 139 to retrieve the energy from a transcritical CO$_2$, and thereby generate the electric energy 103. Specifically, the power unit 150 is configured to pump a liquid CO$_2$ to high pressure, heat the high pressure CO$_2$ using a turbine exhaust and hot molten salt and/or the hot source 139 to produce a hot sCO$_2$ so as to retrieve the stored excess electric power 102 and the thermal energy 132 directly from the transcritical CO$_2$, and thereby generate the electric energy 103.

Figure 2:
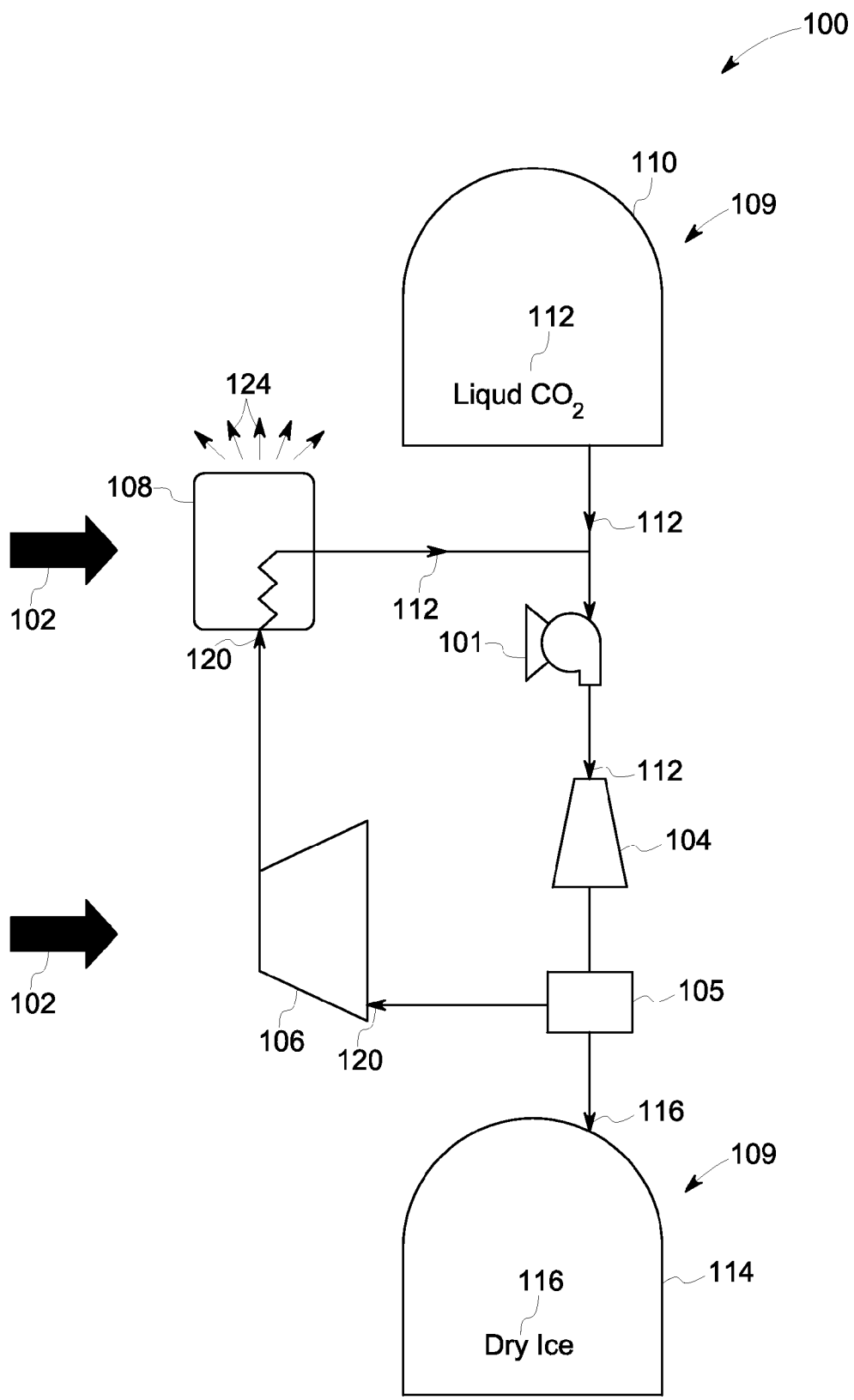
FIG. 2 illustrates a schematic diagram representing a refrigeration unit having a first and second insulated tanks in accordance with the exemplary embodiment of FIG. 1.

FIG. 2 represents the refrigeration unit 100 of the charging cycle 12 in accordance with the exemplary embodiment of FIG. 1. The refrigeration unit 100 is driven by the excess electric power 102 and includes a liquid pump 101, an expansion device 104, a phase separator device 105, a compressor 106, and a cooling unit 108. The refrigeration unit 100 further includes a storage tank 109 including a first insulated tank 110 for storing a liquid carbon dioxide (CO$_2$) 112 and a second insulated tank 114 (i.e. cold energy storage) for storing a dry ice 116. The first insulated tank 110 may be a pressure chamber and is configured to store the liquid CO$_2$ 112 at a first pre-determined condition, for example, at about 45 bar and at about 20 degrees centigrade. Similarly, the second insulated tank 114 may also be a pressure chamber and may be configured to store the dry ice 116 at a second pre-determined condition, for example, at about 5 bar and at about −56 degrees centigrade.

In one embodiment, the refrigeration unit 100 generates the cold energy storage 114 by converting the liquid CO$_2$ 112 to a dry ice 116 and continuously performing the conversion process for storing the excess electric power 102 in the form of the dry ice 116 the liquid CO$_2$ 112.

During operation of the refrigeration unit 100, the liquid pump 101 receives a liquid CO$_2$ 112 from the first insulated tank 110 and the cooling unit 108 and increases pressure of the liquid CO$_2$ 112. The expansion device 104, for example an isenthalpic nozzle, expands a pressurized liquid CO$_2$ 112 received from the liquid pump 101. As a result of expansion of the mixture of pressurized liquid CO$_2$ 112 a portion of the pressurized liquid CO$_2$ 112 is converted into the dry ice 116 and a remaining portion of the pressurized liquid CO$_2$ 112 is converted into a vaporized CO$_2$ 120. The phase separator device 105 disposed downstream relative to the expansion device 104, separates the dry ice 116 from the vaporized CO$_2$ 120 using, for example, a barrier, a filter, or a vortex flow separator. In one or more embodiments, the phase separator device 105 includes one or more weir separators, filter separators, cyclone separators, sheet metal separators, or a combination of two or more of the foregoing separators. In one embodiment, the dry ice 116 and the vaporized CO$_2$ 120 is at about 5.2 bar or above.

The second insulated tank 114 receives the solid CO$_2$ 116 from the phase separator device 105 to generate the cold energy storage 114. The compressor 106, for example a reciprocating compressor, receives the vaporized CO$_2$ 120 from the phase separator device 105 and compresses the vaporized CO$_2$ 120 so as to increase pressure and temperature of the vaporized CO$_2$ 120. In one embodiment, the vaporized CO$_2$ 120 at an outlet of the compressor 106 is at about 45 bar and at about 100 degrees centigrade.

The cooling unit 108 receives the vaporized CO$_2$ 120 from the compressor 106 and exchanges heat with an ambient environment 124 so as to produce the liquid CO$_2$ 112. In one embodiment, a working medium may be circulated within the cooling unit 108 for extracting heat from the vaporized CO$_2$ 120 and exchanging heat with the ambient environment 124 so as to reduce the temperature of the vaporized CO$_2$ 120 and produce the liquid CO$_2$ 112. In one embodiment, the liquid CO$_2$ 112 at an outlet of the cooling unit 108 is at about 45 bar and at about 20 degrees centigrade. The liquid CO$_2$ 112 exits the cooling unit 108 at a reduced temperature and at an elevated pressure. The liquid CO$_2$ 112 from the first insulated tank 110 is mixed with the liquid CO$_2$ 112 exited from the cooling unit 108, and fed to the liquid pump 101 to continuously repeat the charging cycle 12 of converting the liquid CO$_2$ 112 to dry ice 116.

In the illustrated embodiment of FIG. 2, the refrigeration unit 100 operates to reject heat to the ambient environment 124 during the process of conversion of the vaporized CO$_2$ 120 to dry ice 116 and directly stores the energy i.e. excess electric power 102 in the form of the dry ice 116. In such embodiment, the vaporized CO$_2$ 120 is directly condensed in the cooling unit 108 and converted in to liquid $CO_2$ by rejecting heat to the ambient environment 124. In another embodiment, the cooling unit 108 may use a working fluid different than a working medium (e.g. $CO_2$) of the electro-thermal energy storage system 100, for exchanging heat with the ambient environment 124. In one or more embodiments, suitable working fluid includes propane, ammonia, and the like. The use of working fluid to exchange heat with the ambient environment 124 may help in improving efficiency of the refrigeration unit 100. In certain other embodiments, when the ambient environment 124 is substantially hot, the refrigeration unit 100 may exchange heat with a cold source (not shown in FIG. 2) so as to reject the heat during the process of conversion of the vaporized $CO_2$ 120 to dry ice 116. In such embodiment, the cold source may be water and the like.

Figure 3:
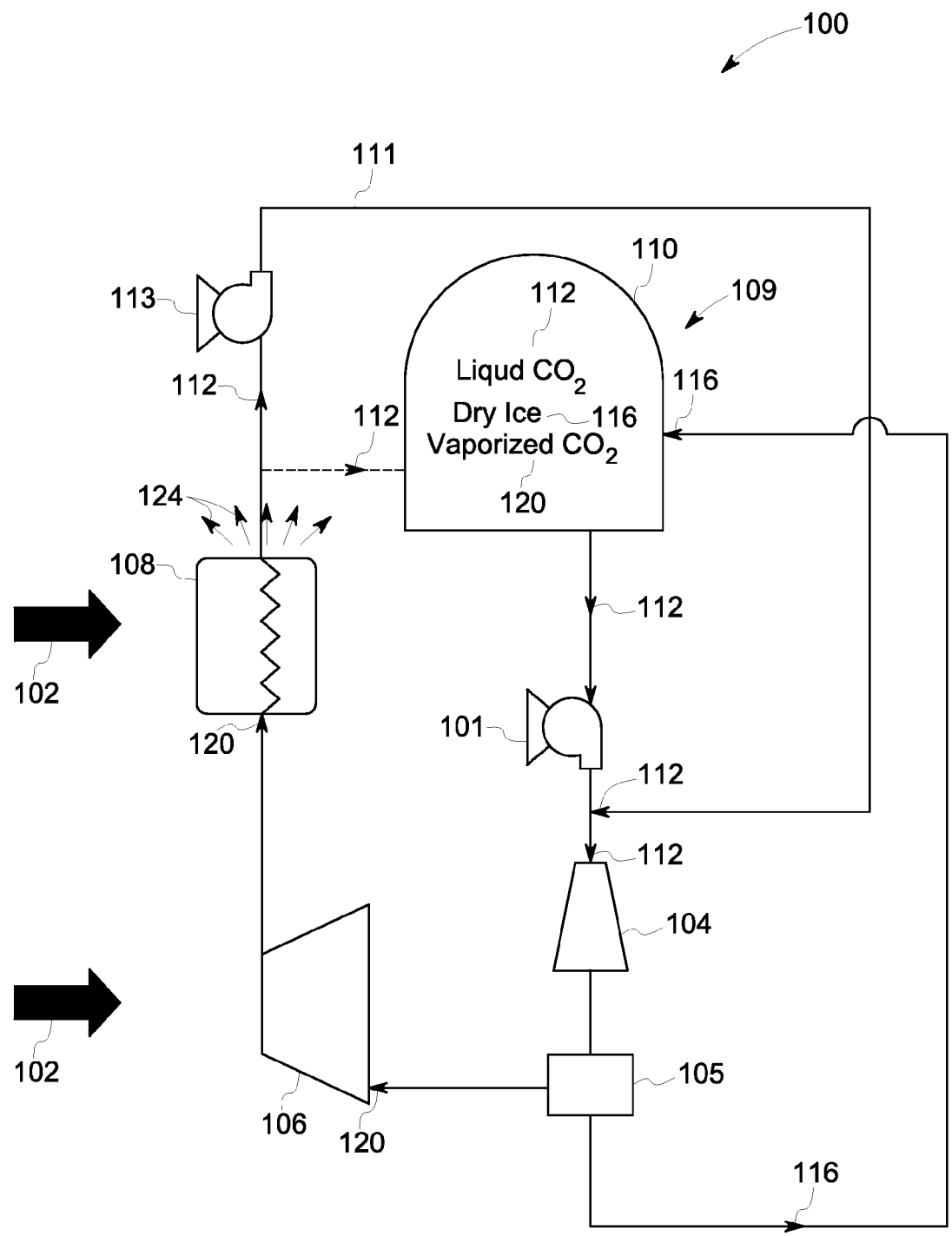
FIG. 3 illustrates a schematic diagram representing a refrigeration unit having a storage tank in accordance with the exemplary embodiment of FIG. 1.

FIG. 3 represents the refrigeration unit 100 of the charging cycle 12 in accordance with the exemplary embodiment of FIG. 1. The refrigeration unit 100 additionally includes a recirculation loop 111, a liquid pump 113 and the storage tank 109 in comparison with the plurality of components shown in the refrigeration unit 100 of FIG. 2. In one embodiment, the storage tank 109 may be a pressure chamber and is configured to store the liquid $CO_2$ 112 and dry ice 116.

Figure 5:
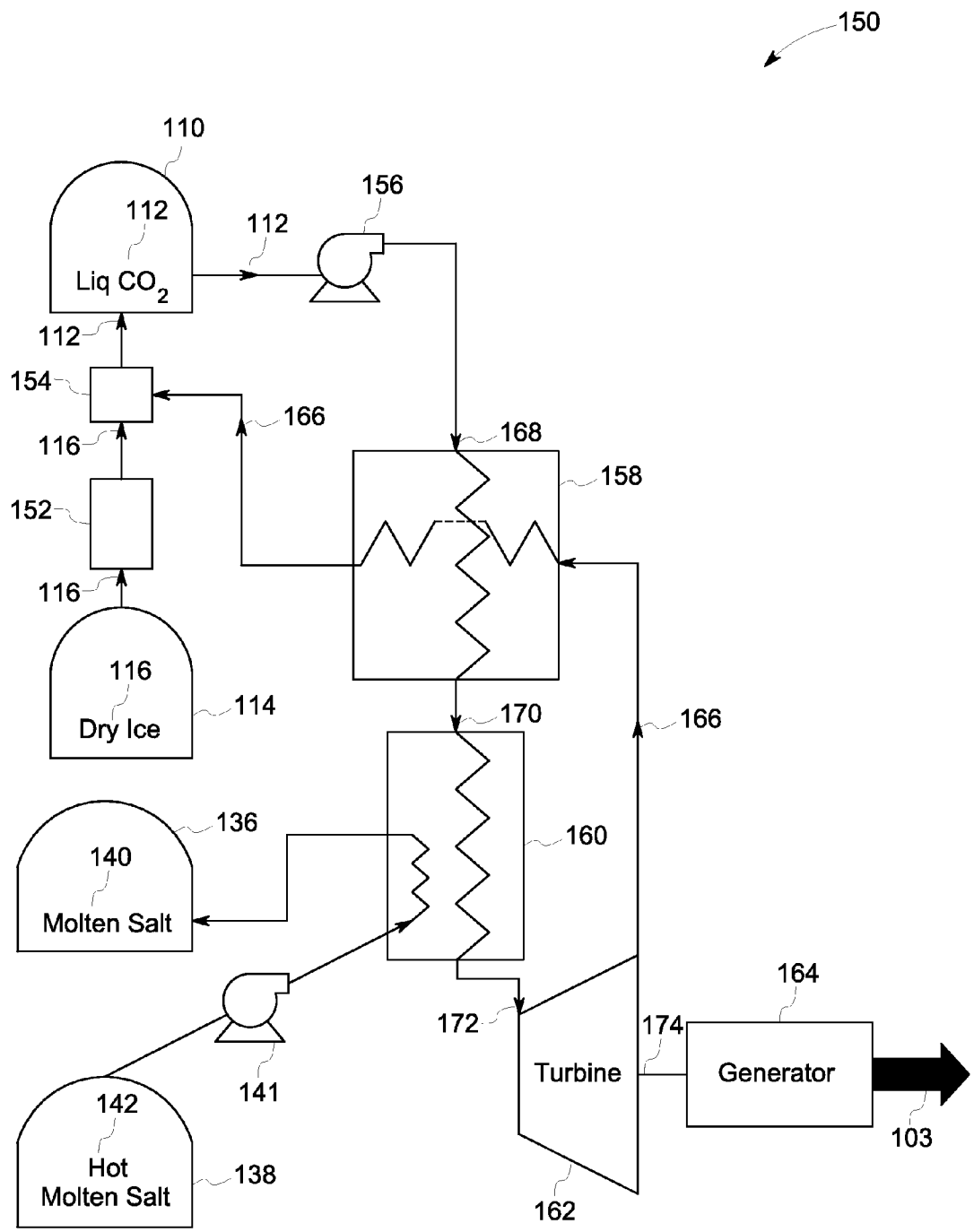
FIG. 5 illustrates a schematic diagram representing a power unit operating using a cold energy storage kept in an insulation tank, and a hot energy storage in accordance with the exemplary embodiment of FIG. 1.

In one embodiment, the liquid $CO_2$ 112 produced in the cooling unit 108 is recirculated into the expansion device 104 via the recirculation loop 111. In such embodiment, the liquid pump 113 may be coupled an outlet of the cooling unit 108 and the recirculation loop 113 for feeding the liquid $CO_2$ 112 to the expansion device 104. The storage tank 109 is configured to store both liquid $CO_2$ 112 and dry ice 116 at the triple point of a $CO_2$. Further, the storage tank 109 may also include vaporized $CO_2$ 120, which is formed by the condensation of the liquid $CO_2$ 120 with dry ice 116. In thermodynamics, the triple point of any substance is a temperature and pressure at which the three phases of that substance coexist in thermodynamic equilibrium. In one embodiment, the liquid $CO_2$ 112 is formed only at pressures above 5.1 atmospheres, and the triple point of $CO_2$ is at about 518 kilopascal at –56.6 degree centigrade. In such embodiment, the dry ice 116 is fed into the storage tank 109 from the phase separator device 105, and the liquid $CO_2$ may be optionally fed into the storage tank 109 from the cooling unit 108. The storage tank 109 may be further configured to feed the dry ice 116 to a liquid pump 156 (as shown in FIG. 5) of the power unit 150, which will be explained in greater detail below. In one or more embodiments, the triple point of the $CO_2$ is about 5.18 bar and about –56.6 degree centigrade.

Figure 4:
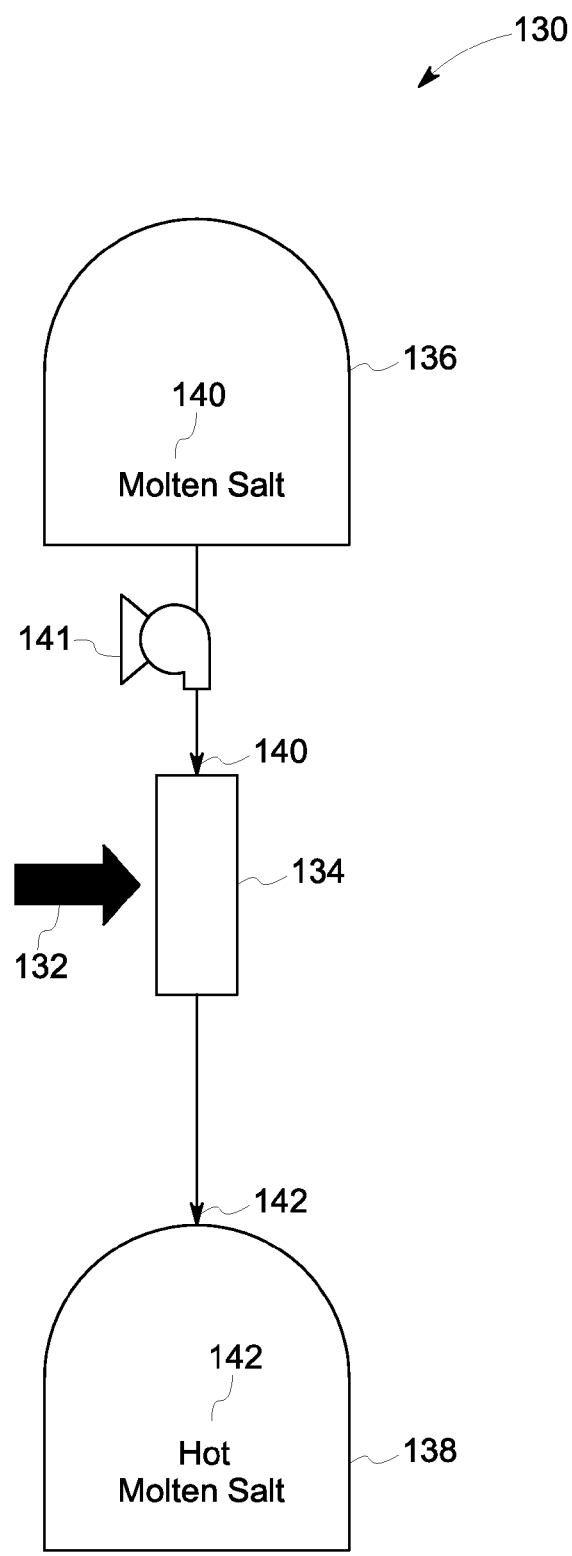
FIG. 4 illustrates a schematic diagram representing a thermal unit in accordance with the exemplary embodiment of FIG. 1.

FIG. 4 represents the thermal unit 130 of the charging cycle 12 in accordance with the exemplary embodiment of FIG. 1. The thermal unit 130 is driven by the thermal energy 132, for example the solar energy obtained through the concentrated solar power (CSP). In another embodiment, the thermal unit 130 may be driven by a waste heat obtained from an industrial machine such as a gas turbine, and a steel refinery, and the like. In the illustrated embodiment, the thermal unit 130 includes a heat exchanger 134, a first storage tank 136, a second storage tank 138 (i.e. hot energy storage), and a pump 141.

The first storage tank 136 is configured to store a molten salt 140 at about 280 degrees centigrade. Similarly, the second storage tank 138 is configured to store a hot molten salt 142 at about 550 degrees centigrade.

In one embodiment, the thermal unit 130 generates the hot energy storage 138 by adding heat to the molten salt 140. In such embodiment, the addition of heat does not result in phase change of the medium. In another embodiment, the hot energy storage may be generated by adding heat to a mixture of potassium nitride and sodium nitride. In yet another embodiment, the hot energy storage may be generated by adding heat to sand particles.

During operation of the thermal unit 130, the pump 141 disposed downstream relative to the first storage tank 136 receives the molten salt 140 from the first storage tank 136 and increase pressure of the molten salt 140. The heat exchanger 134 may be configured to receive the pressurized molten salt 140 from the pump 141 and exchange heat between the pressurized molten salt 140 and the thermal energy 132. In such embodiment, the thermal energy 132, for example, the solar energy, may be used to heat a fluid such as water, to produce a hot fluid (i.e. vaporized fluid) having higher temperature than the molten salt 140. Later, the hot fluid may be used to exchange heat with the molten salt 140 received from the first storage tank 138 to produce the hot molten salt 142. In some other embodiment, the thermal energy 132, for example, the solar energy may directly heat the molten salt 140 flowing through a plurality of heat exchange tubes (not shown in FIG. 5) of the heat exchanger 134 to produce the hot molten salt 142. The second storage tank 138 receives the hot molten salt 142 from the heat exchanger 134 to generate the hot energy storage 138. In one embodiment, the thermal unit may be a shell and tube heat exchanger. Various other types of heat exchanger may be envisioned without deviating from the scope of the present invention. In another embodiment, the thermal unit 130 may directly use thermal energy 132 such as a gas turbine exhaust stream, an exhaust stream from a fossil combustion process, a concentrated solar power heater, hot stream from industrial process, and the like to provide the hot source 139 which may be used to heat a supercritical $CO_2$ (not shown in FIG. 4) in the power unit 150.

FIG. 5 represents the power unit 150 of the discharging cycle 14 in accordance with the exemplary embodiment of FIG. 1.

The power unit 150 is configured to operate between the cold energy storage 114 and the hot energy storage 138 to retrieve the energy from the dry ice 116 and the hot molten salt 142. In the illustrated embodiment, the power unit 100 includes a posimetric pump 152, a mixing chamber 154, a liquid pump 156, a first heat exchanger 158, a second heat exchanger 160, a turbine 162, and a generator 164.

During operation of the power unit 150, the posimetric pump 152 receives the dry ice 116 from the second insulated tank 114 (i.e. cold energy storage) and boost pressure of the dry ice 116. In one embodiment, the pressure of the dry ice 116 is boosted up to about 45 bar. Various other types of pump which may be configured to boost the pressure of the solid medium may be envisioned without deviating from the scope of the present invention. The mixing chamber 154 receives the dry ice 116 at the elevated pressure from the posimetric pump 152 and a vaporized $CO_2$ 166 (i.e. exhaust) discharged from the turbine 162 via the first heat exchanger 158 (i.e. recuperator). The mixing chamber 154 is configured to condense the vaporized CO2 166 by mixing the dry ice 116 directly with the vaporized $CO_2$ 166 so as to produce the liquid $CO_2$ 112.

Subsequently, the first insulated tank 110 disposed downstream relative to the mixing chamber 154 receives the liquid $CO_2$ 112 from the mixing chamber 154 and stores the liquid $CO_2$ 112 temporarily before feeding to the liquid pump 156. The first insulated tank 110 is also configured to accumulate the excess liquid $CO_2$ 112. In one embodiment, the liquid pump 156 is configured to boost the pressure of the liquid $CO_2$ 112 to produce a high pressure $CO_2$ 168. In such embodiment, the pressure of the liquid $CO_2$ 112 is boosted up to about 250 bar.

The first heat exchanger 158 is disposed downstream relative to the liquid pump 156, and is configured to receive the high pressure $CO_2$ 168 produced at the liquid pump 156 and the exhaust from the turbine 162. In one embodiment, the exhaust from the turbine 162 includes the vaporized $CO_2$ 166 having a temperature greater than a temperature of the high pressure $CO_2$ 168. Subsequently, the first heat exchanger 158 exchanges heat between the vaporized $CO_2$ 166 and the high pressure $CO_2$ 168 and thereby produce a supercritical carbon dioxide ($sCO_2$) 170.

The second heat exchanger 160 is disposed downstream relative to the first heat exchanger 158, and is configured to receive the $sCO_2$ 170 from the first heat exchanger 158. The second heat exchanger 160 is further configured to receive the hot molten salt 142 from the second storage tank 138 (i.e. hot energy storage) via the pump 141. In one embodiment, the hot molten salt 142 has a temperature greater than a temperature of the $sCO_2$ 170. The second heat exchanger 160 exchanges heat between the hot molten salt 142 and the hot $sCO_2$ 170 and thereby add further heat to the $sCO_2$ 170 to produce a hot $sCO_2$ 172 having higher temperature than the $sCO_2$ 170. In the illustrated embodiment, the hot molten salt 142 after exchanging heat with the $sCO_2$ 170 exits the second heat exchanger 160 and is stored in the first storage tank 140 as the molten salt 140 having less temperature than the hot molten salt 142.

In one embodiment, the first heat exchanger 158 and the second heat exchanger 160 may be a shell and tube heat exchanger including an inlet plenum chamber, an outlet plenum chamber, and a bundle of tubes coupled to the inlet and outlet plenum chambers. The bundle of tubes may be disposed in a chamber formed between the inlet plenum chamber and outlet plenum chamber. The chamber may be configured to receive the vaporized $CO_2$ 166 and the inlet plenum chamber, the bundle of tubes, and the outlet plenum chamber may be configured to receive the high pressure $CO_2$ 168 and the $sCO_2$ 170. In one or more embodiments, the shell and tube heat exchanger may be designed for a cross-current flow or a counter current flow of the mediums.

The hot $sCO_2$ 172 exits from the second heat exchanger 160 and enters the turbine 162 where the hot $sCO_2$ 172 is expanded thereby causing the turbine 162 coupled to a generator 164 via a shaft 174, to generate the electric energy 103. The vaporized $CO_2$ 166 produced at the exhaust of the turbine 162 is routed to the mixing chamber 154 via the first heat exchanger 158. In the mixing chamber 154 the vaporized $CO_2$ 166 is condensed by mixing directly with the dry ice 116 received from the posimetric pump 152, so as to produce the liquid $CO_2$ to continuously repeat the discharging cycle 14 of converting the dry ice 116 to liquid $CO_2$ 112.

In the illustrated embodiment of FIG. 5, the power unit 150 of the discharging cycle 14 operates transcritically during the process of retrieving energy from the dry ice 116 and the hot molten salt 142. The power unit 150 retrieves energy directly from the hot $sCO_2$ 170 and generates the electric energy 103. Specifically, in the discharging cycle, the dry ice 116 is mixed with vaporized $CO_2$ 166 to produce the liquid $CO_2$.112. Subsequently, the liquid $CO_2$ 112 is pumped to produce the high pressure $CO_2$ 168, which is heated using the turbine exhaust 166 and the hot molten salt 142 to produce hot $sCO_2$ 172 which is expanded to retrieve the energy directly from the hot $sCO_2$ 172.

Figure 6:
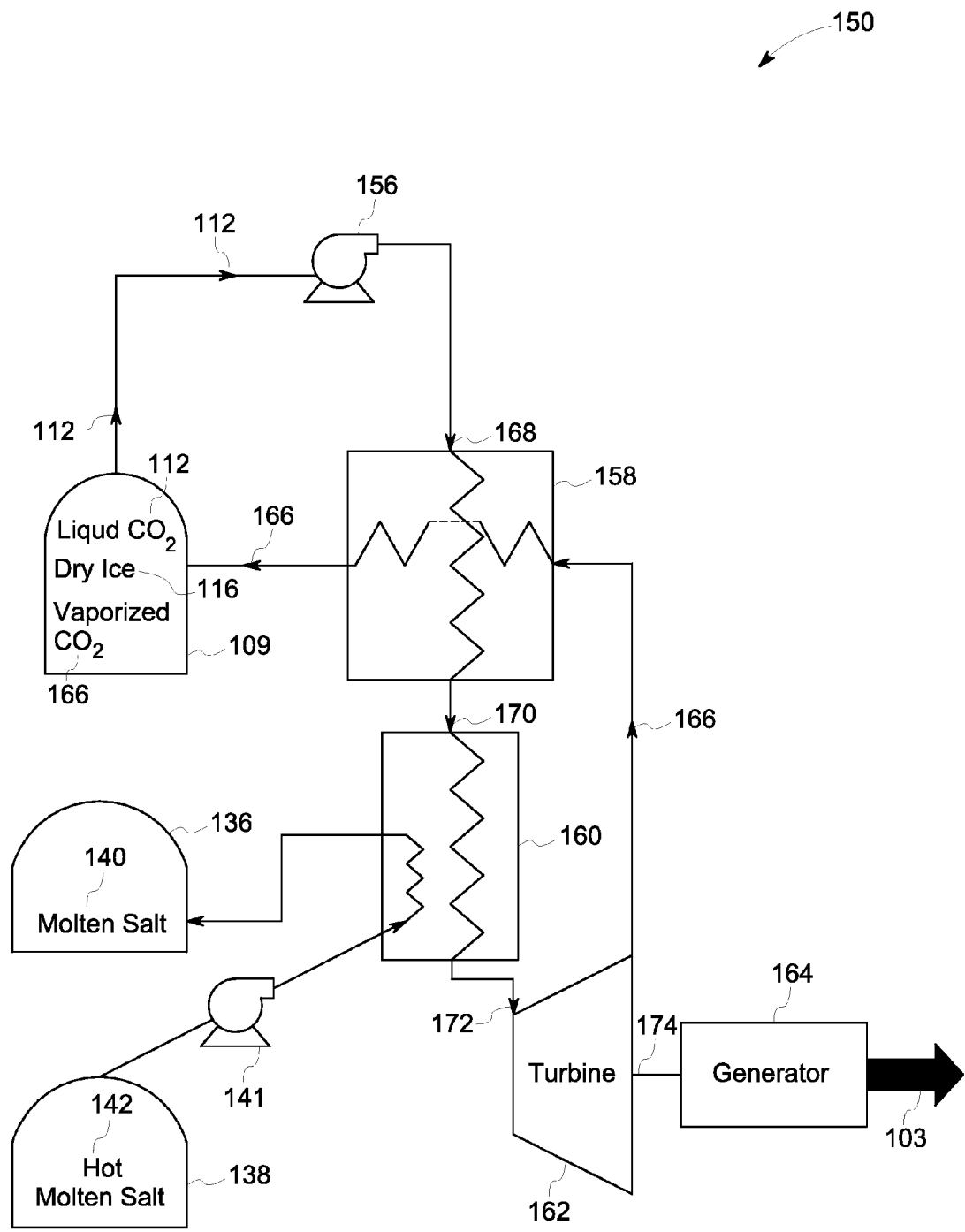
FIG. 6 illustrates a schematic diagram representing a power unit operating using a cold energy storage kept in a storage tank, and a hot energy storage in accordance with the exemplary embodiment of FIG. 1.

FIG. 6 represents the power unit 150 of the discharging cycle 14 in accordance with the exemplary embodiment of FIG. 1.

In the illustrated embodiment, the vaporized $CO_2$ 166 from the turbine 162 after flowing through the first heat exchanger 158 is mixed directly in the storage tank 109 containing dry ice 116 and liquid $CO_2$ at the triple point of $CO_2$. In one embodiment, the triple point of $CO_2$ is about 5.2 bar and about −56.6 degree centigrade. In the storage tank 109, the vaporized $CO_2$ 166 is condensed, while melting the dry ice 116 to produce the liquid $CO_2$. In such embodiment, the storage tank 109 includes the vaporized $CO_2$ 166, the dry ice 116 and the liquid $CO_2$ at triple point of $CO_2$.

The liquid $CO_2$ 112 from the storage tank 109 is pumped to a higher pressure via the liquid pump 156 before feeding the pressurized liquid $CO_2$ 168 into the first heat exchanger 158. In some other embodiments, the dry ice 116 from the storage tank 109 may be pumped via the posimetric pump 152 (as shown in FIG. 5) to boost pressure of the dry ice 116 and mixed in the mixing chamber 154 (as shown in FIG. 5) with the vaporized $CO_2$ 166 to produce the liquid $CO_2$ 168, which may be temporarily stored in the first insulated tank 110 before feeding to the liquid pump 156. In one embodiment, the pressure of the dry ice 116 is boosted up to about 45 bar in the posimetric pump 152.

Figure 7:
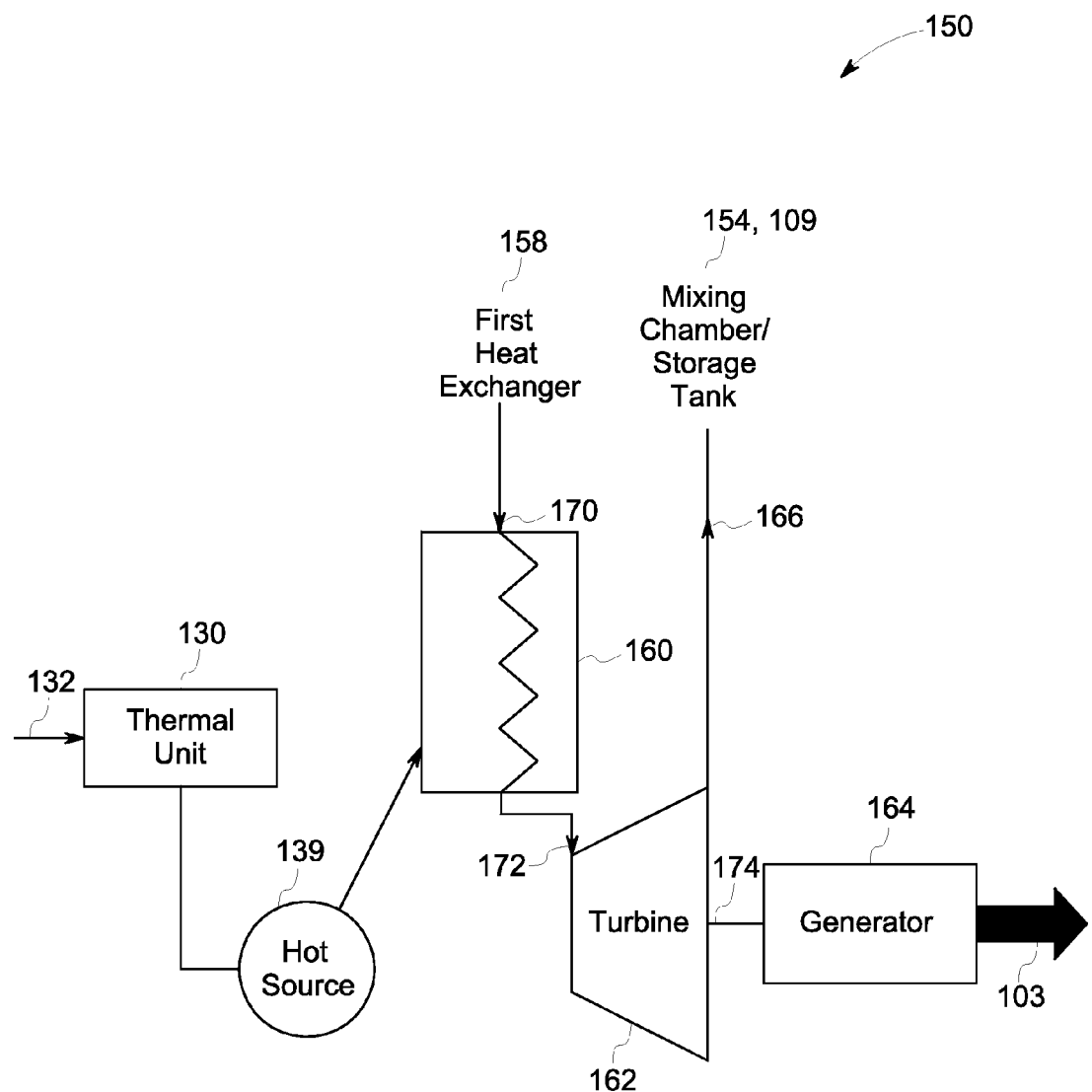
FIG. 7 illustrates a schematic diagram representing a power unit operating using a cold energy storage and a hot source in accordance with the exemplary embodiment of FIG. 1.

FIG. 7 represents the power unit 150 of the discharging cycle 14 in accordance with the exemplary embodiment of FIG. 1.

In the illustrated embodiment, the thermal unit 130 directly uses thermal energy 132 such as a gas turbine exhaust stream, an exhaust stream from a fossil combustion process, a concentrated solar power heater, hot stream from industrial process, and the like to provide the hot source 139. In such embodiment, the hot source 139 is fed to the second heat exchanger 160 to heat the supercritical $CO_2$ 170 received from the first heat exchanger 158.

In one embodiment, the turbine exhaust 166 (i.e. vaporized $CO_2$ 166) may be fed to the mixing chamber 154 as shown in the embodiment of FIG. 5 to produce the liquid $CO_2$ 170 by condensing the vaporized $CO_2$ 166 and melting the pressurized dry ice 116 received from the posimetric pump 152. In another embodiment, the turbine exhaust 166 (i.e. vaporized $CO_2$ 166) may be fed to the storage tank 109 to containing dry ice 116 and liquid $CO_2$ at the triple point of $CO_2$ as shown in the embodiment of FIG. 6. In such embodiment, the vaporized $CO_2$ 166 is condensed within the storage tank 109, while melting the dry ice 116 to produce the liquid $CO_2$.

In accordance with certain embodiments discussed herein, an electrothermal energy storage system facilitates to meet a round-trip energy efficiency target because the system requires substantially less energy (work) to compress a solid $CO_2$ to high pressure during a discharge phase. Further, the electrothermal energy storage system facilitates to meet the cost target because a net energy storage density is high i.e. greater than 200 MJ/m3 (mega joule/meter$^3$), thereby minimizing a storage volume cost of a liquid $CO_2$. Further, the system may be scalable because it does not require storing of the pressurized liquid $CO_2$ in caverns. A 100 MWh system with a net volumetric energy density of about 200 MJ/m$^3$ may require a storage volume of about 2000 m$^3$ (about 2000 tons) of dry ice and liquid $CO_2$ which may be a feasible volume at a modest pressure (i.e. at about 5 bar dry ice, and about 45 bar liquid $CO_2$). Further, the present invention may meet a life and cycle requirement of an energy management because it is pure thermal cycle and electrical cycle with no catalysts or electrolytes to degrade the system.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. An electrothermal energy storage system having a charging cycle and a discharging cycle, the system comprising:
a refrigeration unit configured to generate a cold energy storage comprising a solid carbon dioxide, wherein the refrigeration unit is driven by an electric power, and wherein the refrigeration unit comprises a liquid pump configured to increase pressure of a liquid carbon dioxide, an expansion device configured to expand the liquid carbon dioxide to produce the solid carbon dioxide and a vaporized carbon dioxide, a compressor configured to increase pressure of the vaporized carbon dioxide, and a cooling unit configured to convert the vaporized carbon dioxide into the liquid carbon dioxide by exchanging heat with an ambient environment;
a thermal unit configured to provide at least one of a hot energy storage and a hot source; and
a power unit configured to operate between the cold energy storage and at least one of the hot energy storage, and the hot source to retrieve energy,
wherein the power unit is configured to produce a high pressure carbon dioxide and a supercritical carbon dioxide, and to generate an electric energy using the supercritical carbon dioxide.

2. The system of claim 1, wherein the refrigeration unit further comprises a storage tank configured to store the liquid carbon dioxide, and the solid carbon dioxide at a triple point of a carbon dioxide to generate the cold energy storage.

3. The system of claim 1, wherein the refrigeration unit further comprises a storage tank including a first insulated tank configured to store the liquid carbon dioxide, and a second insulated tank configured to store the solid carbon dioxide to generate the cold energy storage.

4. The system of claim 1, wherein the thermal unit is driven by a thermal energy to generate the hot energy storage comprising a hot molten salt, wherein the thermal energy comprises at least one of a waste heat and a solar energy.

5. The system of claim 1, wherein the hot source is produced by a thermal energy comprising at least one of a waste heat and a solar energy.

6. The system of claim 1, wherein the power unit comprises a liquid pump configured to increase pressure of a liquid carbon dioxide received from at least one of a storage tank and a mixing chamber to produce the high pressure carbon dioxide.

7. The system of claim 6, wherein the power unit further comprises a first heat exchanger configured to heat the liquid carbon dioxide by exchanging heat with a vaporized carbon dioxide received from a turbine exhaust to produce the supercritical carbon dioxide.

8. The system of claim 7, wherein the power unit further comprises a second heat exchanger configured to further heat the supercritical carbon dioxide by exchanging heat with at least one of the hot energy storage and the hot source.

9. The system of claim 8, wherein the power unit further comprises a turbine configured to expand the supercritical carbon dioxide, and a generator coupled to the turbine and configured to be driven by the turbine to generate the electric energy.

10. The system of claim 1, wherein the power unit further comprises a posimetric pump configured to increase pressure of the solid carbon dioxide received from a storage tank comprising a first insulated tank, to produce a pressurized solid carbon dioxide, and a mixing chamber configured to directly mix the pressurized solid carbon dioxide with a vaporized carbon dioxide received from a turbine exhaust to produce a liquid carbon dioxide.

11. The system of claim 1, wherein the charging and discharging cycles operate transcritically to store and retrieve energy directly through a carbon dioxide.

12. A method for storing and retrieving energy in an electrothermal energy storage system, the method comprising:
generating a cold energy storage by converting a liquid carbon dioxide into a solid carbon dioxide through a refrigeration unit driven by an electric power, wherein the refrigeration unit is configured to increase pressure of the liquid carbon dioxide using a liquid pump, expand the liquid carbon dioxide to produce the solid carbon dioxide and a vaporized carbon dioxide using an expansion device, compress the vaporized carbon dioxide to increase pressure of the vaporized carbon dioxide using a compressor, and convert the vaporized carbon dioxide into the liquid carbon dioxide by exchanging heat with an ambient environment using a cooling unit;
providing at least one of a hot energy storage, and a hot source through a thermal unit driven by a thermal energy comprising at least one of a waste heat and a solar energy; and
retrieving the energy in the solid carbon dioxide by operating a power unit between the cold energy storage and at least one of the hot energy storage, and the hot source,
wherein the power unit is configured to produce a high pressure carbon dioxide, a supercritical carbon dioxide, and to generate an electric energy using the supercritical carbon dioxide.

13. The method of claim 12, further comprising storing the solid carbon dioxide, and the liquid carbon dioxide at a triple point of a carbon dioxide in a storage tank to generate the cold energy storage.

14. The method of claim 12, further comprising storing the solid carbon dioxide in a storage tank comprising an insulated tank to generate the cold energy storage.

15. The method of claim 12, wherein the providing comprises generating the hot energy storage by adding heat to a molten salt via the thermal unit.

16. The method of claim 12, wherein the retrieving comprises increasing pressure of the liquid carbon dioxide received from at least one of a storage tank and a mixing chamber to produce the high pressure carbon dioxide.

17. The method of claim 16, wherein the retrieving further comprises heating the high pressure carbon dioxide to produce the supercritical carbon dioxide by exchanging heat with a vaporized carbon dioxide received from a turbine exhaust via a first heat exchanger.

18. The method of claim 17, wherein the retrieving further comprises further heating the supercritical carbon dioxide by exchanging heat with at least one of the hot energy storage, and the hot source via a second heat exchanger.

19. The method of claim 18, wherein the retrieving further comprises expanding the supercritical carbon dioxide via a turbine, and generating the electric energy via a generator coupled to the turbine and configured to be driven by the turbine.

20. The method of claim 12, further comprising increasing pressure of the solid carbon dioxide received from a storage tank comprising an insulated tank to produce a pressurized solid carbon dioxide, and directly mixing the pressurized solid carbon dioxide with a vaporized carbon dioxide received from a turbine exhaust to produce the liquid carbon dioxide.

\* \* \* \* \*